3,383,432
EPOXIDE COMPOSITION CONTAINING THE POLYGLYCIDYL ETHERS OF 2,4-BIS-(4-HYDROXYCUMYL)-PHENOL, BIS-(4-HYDROXY CUMYL)-BIS-(4-HYDROXY-PHENYL) 2,2-PROPANE AND 2,2-BIS-(4-HYDROXY PHENYL)-PROPANE
Heinrich Krimm, Krefeld-Bockum, Hermann Schnell, Urdingen, Rolf Kubens, Leverkusen, and Karl-Heinz Andres, Cologne-Flittard, Germany, assignors to Farbenfabriken Bayer Aktiengesellschaft, Leverkusen, Germany, a German corporation
No Drawing. Filed Mar. 29, 1965, Ser. No. 443,671
Claims priority, application Germany, Apr. 17, 1964, F 42,638
2 Claims. (Cl. 260—830)

ABSTRACT OF THE DISCLOSURE

Epoxy ethers of polyhydroxy diarylalkanes containing at least one hydroxyphenyl alkylene radical bonded to at least one of said aryl nuclei and preparation of cross-linked products therefrom.

The present invention relates to a new class of epoxy ethers of special polyhydric phenols and to their preparation. More particularly, the invention relates to new epoxy ethers of polyhydroxy diarylakanes containing at least one hydroxyphenylalkylene radical bonded to at least one of the aromatic nuclei, and to the utilization of these new ethers for the preparation of cross-linked products.

The invention provides particularly useful polyglycidylethers of polyhydric polynuclear phenols having at least 3, and preferably 3 to 4 phenolic hydroxy groups obtained by condensing a bis-(hydroxyaryl)-alkane with an alkenylphenol. The invention further provides cured products obtained by reacting the new polyglycidylethers with epoxy curing agents, such as polybasic acid anhydrides or polyamines.

The cured products of known polyglycidyl ethers of dihydroxydiaryl alkanes, more especially 2,2-bis-(4-hydroxyphenyl)-propane (bisphenol A), are superior to the cured products of epoxy resins produced from other polyhydric phenols because of higher heat stability and equivalent bending strength, elasticity and hardness.

However, this is still not completely adequate for many purposes, so that it has already been proposed to obtain more highly cross-linked products by concurrent use of trihydric or polyhydric phenols, more especially 7,2′,4′-trihydroxy-2,4,4-trimethyl flavane, in order in this way still further to improve the heat stability. However, the products obtained in this way display reduced breaking strength and elasticity.

It has now been found that these disadvantages can be avoided by means of the new polyepoxy compounds of the invention.

The new polyepoxy compounds are derived from polyhydric polynuclear phenols which may be obtained by reacting bis-(monohydroxyaryl)-alkanes with alkenyl phenols in the presence of acid or alkaline catalysts in accordance with the process of British patent specification No. 963,294 or by heating bis-(monohydroxyaryl)-alkanes in admixture with acid or alkaline catalysts and distilling off phenols in accordance with the process disclosed in British patent specification No. 980,278.

The preferred polyphenols to be used as starting materials for the preparation of the new polyepoxy compounds are bis-(4-hydroxyphenyl)-alkanes, especially 2,2-bis-(4-hydroxyphenyl)-propane, which are substituted in at least one ortho position to the hydroxy group of a phenyl radical by an alkyl group, including a cycloalkyl group, which is substituted by a hydroxyphenyl group. These compounds may be illustrated by the formulae:

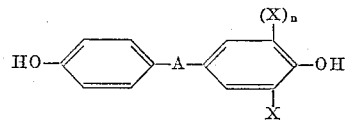

and

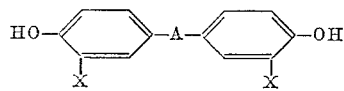

wherein

A represents a bivalent aliphatic radical preferably having 1 to 6 carbon atoms, a bivalent cycloaliphatic radical, such as a cyclohexyl radical, or a bivalent aliphatic radical, preferably having 1 to 6 carbon atoms, which is substituted by an aryl radical, preferably a phenyl radical;

X represents a radical of the formulae:

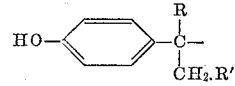

wherein

R and R′ stand for hydrogen, an alkyl radical, preferably having 1 to 4 carbon atoms, an aryl radical, preferably a phenyl radical and wherein R and R′ stand for the members necessary to form a cycloaliphatic ring;

$n$ is a whole integer from 0 to 1.

Of particular interest are the 2,2-bis-(hydroxyphenyl)-propanes, which are substituted in ortho position to a hydroxyl group by a 4-hydroxycumyl group, that is to say a group of the formula

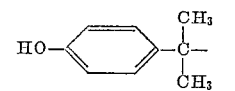

These compounds may be designated as 2,4-bis-(4-hydroxycumyl)-phenol and bis-(4-hydroxycumyl)-bis-(4-hydroxyphenyl)-2,2-propane, the latter compounds being either 2,2-bis-[4-hydroxy-3-(4′-hydroxycumyl)-phenyl]-propane or 2,4,6-tris-(4-hydroxycumyl)-phenol.

Examples of substituted dihydroxydiaryl or higher polyhydroxydiaryl alkanes which can be used according to the invention are the reaction products of one molecule of a dihydroxydiaryl alkane optionally substituted in the aromatic rings, (such as bis-[4-hydroxyphenyl]-methane, -1,1-ethane, -2,2-propane, -2,2-butane, -2,2-pentane, -2,2-hexane and -1,1-cyclohexane), or of a dihydroxytriaryl alkane, (such as bis-[4-hydroxyphenyl]-phenylmethane, 1,1-bis-[4-hydroxyphenyl]-1-phenylethane, etc.), with one or more molecules, preferably one or two molecules, of a p-alkenylphenol, such as p-vinylphenol, p-(2-methylvinyl)-phenol, p-(2-ethylvinyl)-phenol, p-(2,2-dimethylvinyl)-phenol, p-(2-propylvinyl)-phenol, p-(2-isopropylvinyl)-phenol, p-(2-butylvinyl)-phenol, p-(2-methyl-2-propylvinyl)-phenol, p-(2-methyl-2-isopropylvinyl)-phenol, p-(2,2-diethylvinyl)-phenol, p-(2-ethyl-2-isopropylvinyl)-phenol, p-(1-methylvinyl)-phenol=p-isopropenyl-phenol, p-(1-methyl-2-methylvinyl)-phenol=p-isobutenylphenol, p-(1-methyl-2-ethylvinyl)-phenol, p-(1-methyl-2-propylvinyl)-phenol, p-(1-methyl-2-isopropylvinyl)-phenol, p-(1-methyl-2-methyl-2-ethylvinyl)-phenol, p-(1-ethylvinyl)-phenol, p-(1-ethyl-2-methylvinyl)-phenol, p-(1-ethyl-2-ethylvinyl)-phenol, p-(1-ethyl-2-propylvinyl)-phenol, p-(1-ethyl-2-isopropylvinyl)-phenol, p-(1-propylvinyl)-phenol, p-(1-propyl-2-methylvinyl)-phenol, p-(1-propyl-2-ethylvinyl)-phenol, p-(1-isopropylvinyl)-phenol, p-(1,2-tetramethylenevinyl)-phenol, p-(1-phenylvinyl)-phenol and p-(1-methylvinyl)-o-cresol.

The polyglycidyl ethers of the invention may be prepared in a manner known per se by dissolving the aforementioned polyphenols in epichlorhydrin using the latter in a ratio of about 2 to 20 molecules of epichlorhydrin per phenolic hydroxyl group of the polyphenol and then adding an alkali metal hydroxide such as sodium hydroxide. It is convenient to add a small amount of water (about 0.5% or less) to the solution of the polyphenol in the stoichiometric excess of epichlorhydrin and to introduce solid sodium hydroxide gradually with boiling of the reaction mixture. The water added and formed in the reaction is removed by distillation azeotropically with epichlorohydrin. The sodium hydroxide is added in amount that is equivalent on stoichiometric basis to the quantity of polyphenol, or small excess thereof. Upon completion of the reaction, unreacted epichlorohydrin is separated by distillation. The residue is dissolved in methylene chloride, the solution is filtered to remove the salt formed during the reaction, and the filtrate is then distilled to separate the solvent and to leave the polyglycidyl ether.

The polyglycidyl ethers of the invention are solid resins at 20° C. and have substantially all of the phenolic hydroxyl groups etherified with the glycidyl group.

The polyglycidyl ethers of the invention may be cured by themselves, in admixture with each other or with other polyepoxide products in a variety of different proportions, such as with amounts of other polyepoxides varying from 5 to 80 percent by weight. Polyepoxides that may be cured in admixture with the new polyepoxides include glycidyl polyethers of polyhydric phenols and/or polyhydric alcohols. The preferred polyepoxides to be used in admixture with the present polyepoxides are the polyglycidyl ethers of bis-(hydroxyphenyl)-alkanes, especially of bis-phenol A. Preferred are admixtures containing at least 10 percent, preferably at least 20 percent by weight of a polyglycidyl ether of 2,2-bis-(4-hydroxyphenyl)-propane and at least 20 percent by weight of 2,4-bis-(4-hydroxycumyl)-phenol and of a bis-(4-hydroxycumyl)-bis-(4-hydroxyphenyl)-2,2-propane, the two 4-hydroxycumyl groups being bonded to the 4-hydroxyphenyl radicals in ortho position to the hydroxy group of said radicals.

A great variety of different curing agents may be used in effecting the curing of the above described composition. Such agents include amino compounds, such as ethylene diamine, polyalkylene polyamines, such as diethylene triamine, triethylene tetramine, melamine, dicyandiamide, butylene-bis-3-aminopropylether, polybasic organic acids and their anhydrides, such as phthalic anhydride, hexahydrophthalic anhydride, oxalic acid, borontrifluoride as well as their complexes with ethers, acid anhydrides, diazonium salts, phosphoric acid and partial esters of phosphoric acid with monohydric alcohols, such as diethyl orthophosphate, metal salts of inorganic acids, such as zinc fluoborate, magnesium sulfate, ferrous sulfate, condensation products of formaldehyde with phenols or amines, such as melamine.

The amount of the curing agents employed may vary over a range between 1 and 100 percent by weight, as calculated on the amount of polyglycidyl ether, depending on the agent selected. With curing agents having replaceable hydrogen, such as the amine agents, amounts of agent empolyed may vary between 5 and 35 percent by weight of the polyglycidyl ether being cured. With the polybasic acid anhydrides particularly preferred amounts vary from about 10 to 80 percent by weight.

The cured products of the invention have the same hardness, elasticity and breaking strength as the corresponding products of bisphenol A, but show a higher heat stability by comparison with these latter. As well as equally good mechanical properties, it is more especially also the electrical properties (for example the dielectric loss angle, the dielectric constant and the surface resistivity) which are practically unchanged up to high temperatures with the new products. The new products are consequently particularly suitable for purposes in which they are exposed to higher thermal stresses than was possible hitherto.

In addition, the new products have a reduced water absorption and an improved resistance to solvents.

On account of their favourable properties, they are excellently suitable for the production of molded elements, molding compositions, laminates, lacquers, binders and adhesives. The heat stability can be still further improved and the shrinkage reduced by the incorporation of reinforcing elements, such as glass fibres and asbestos, as well as fillers and pigments.

Example 1

228 grams (1 mol) of bis-(4-hydroxyphenyl)-2,2-propane, 134 grams (0.5 mol) of dimeric p-isopropenylphenol and 27.2 grams (0.1 mol) of the sodium salt of bis-(4-hydroxyphenyl)-2,2-propane are heated under nitrogen for 2 hours to 160° C. Thereafter, the reaction product is dissolved in methylene chloride and the solution obtained is made neutral with dilute acetic acid, washed with water and dried. The solvent is thereafter distilled off, eventually at 220° C./12 mm. Hg. The residue is a yellowish brown hard resin. The yield is 260 g.

For ascertaining the composition of this resin the following test distillation is carried through:

50 grams of the resin are distilled under high vacuum. The fraction distilling over at 165 to 170° C./0.1 mm. Hg consists of bis-(4-hydroxyphenyl)-2,2-propane (15 grams). From the fraction distilling over at 230–255° C./0.1 mm. Hg, 22 grams of 2,4-bis-(4-hydroxycumyl)-phenol (melting point 191 to 192° C. from methanol/water) are obtained by dissolving in toluene. The fraction distilling over at 260 to 280° C./0.1 mm. Hg does not crystallize and it consists substantially of bis-(4-hydroxycumyl)-bis-(4-hydroxyphenyl)-2,2-propane.

160 grams of the above resin are dissolved in 600 grams of epichlorhydrin and 3 grams of water and 52 grams of powdered sodium hydroxide are added in 6 portions at 90 to 118° C., while the water of reaction is removed by distillation azeotropically with epichlorhydrin. The distillate is condensed in a water separator where it separates into an upper aqueous phase and a lower epichlorohydrin phase, which latter phase is returned as reflux. The first portion of sodium hydroxide is added at 90° C., then one awaits the heat of reaction, heats to boiling point until the internal temperature has reached 118° C., allows the temperature to fall to 95° C. and then the second portion is aded. After 100 minutes, all the sodium hydroxide has been added. Heating is continued for another 30 minutes until the water of reaction is removed, the excess epichlorhydrin is distilled off in vacuo up to 140° C. internal temperature, the residue is dissolved in methylene chloride, filtered and the solvent is removed at temperatures up to 170° C./12 mm. Hg. There are obtained 210 grams of a yellowish soft resin of the epoxide number 7.9, corresponding to an equivalent weight of 202.

70 grams of this soft resin are melted with 31 grams of phthalic anhydride and 5 drops of N,N-dimethyl cyclohexylamine and cured in an open mold at 150° C. A light molded element is obtained which has the properties set out in the following table.

Example 2

181 grams (0.5 mol) of 2,4-bis-(4-hydroxycumyl)-phenol are reacted as indicated in Example 1 with 700 grams of epichlorhydrin and 63.5 grams of powdered sodium hydroxide. There are obtained 240 grams of a yellowish soft resin with an epoxide number of 8.0, corresponding to an equivalent weight of 200. 70 grams of this epoxide resin are hardened with 52 grams of phthalic anhydride and 5 drops of N,N-dimethylcyclohexyl amine, as described in Example 1. The properties of the hardened product correspond to the product according to Example 1. The heat stability according to Martens is 180° C.

Example 3

Using the process of British patent specification 963,294 a melt of 5 kg. of bis-(4-hydroxyphenyl)-2,2-propane and 2.5 grams of powdered sodium hydroxide is heated under nitrogen at 40 to 50 mm. Hg to 180 to 190° C., while phenol is distilled off over a steam-heated filler body column. After 6 hours, 860 grams of phenol are separated out. 6 grams of phthalic anhydride are added to neutralize the sodium hydroxide and the temperature kept for half an hour at 160° C. After removing the column, the reaction product is heated at 8 mm. Hg to 200° C. and kept for 10 minutes at this temperature until all volatile constituents have distilled off (210 grams, mainly phenol). There are obtained 3.99 kg. of a yellow hard resin with a hydroxyl number of 458 (the OH number calculated for 2,4-bis-(4-hydroxycumyl)-phenol is 464). As is established by a test distillation in the manner indicated in Example 1, this resin consists of 23% of bis-(4-hydroxyphenyl)-2,2-propane, 40% of 2,4 - bis - (4-hydroxycumyl)-phenol (melting point 191 to 192° C.) and 37% of bis-4-(hydroxycumyl) - bis - (4-hydroxyphenyl)-2,2-propane. 900 grams of this resin are reacted as described in Example 1 with 3.5 grams of epichlorhydrin, 295 grams of powdered sodium hydroxide and 9 grams of water. There are obtained 1180 grams of a yellowish resin with an epoxide number of 8.05, corresponding to an equivalent weight of 199.

70 grams of the epoxide resin are hardened with 52 grams of phthalic anhydride, as described in Example 1. The hardened molded element corresponds in all parts to the products of Examples 1 and 2. The heat stability according to Martens of the hardening products is 179° C.

115 grams of the epoxide resin are mixed with 12 grams of diethylene triamine at 60° C. and hardened in an open mould at 50° C. The heat stability according to Martens of the resulting hardening product is 116° C. By tempering for 15 hours at 150° C., this can be increased to 166° C.

100 grams of the epoxide resin are mixed with 26 grams of 1,4-butylene-bis-3-aminopropylether at 60° C. and hardened at 50° C. The heat stability according to Martens of the resulting hardening product is 93° C.

Example 4

228 grams (1 mol) of bis-(4-hydroxyphenyl)-2,2-propane, 268 grams of p-isopropenyl phenol resin (oligomeric p-isopropenyl phenol) and 8 grams of powdered sodium hydroxide are heated while passing over nitrogen for 2 hours to 160° C. The reaction product is taken up in ethylene chloride, shaken with dilute hydrochloric acid until neutral, and the solvent and volatile constituents are distilled off up to 200° C./12 mm. Hg. The residue (470 grams) is a brownish hard resin with an OH-number of 454.

450 grams of this resin are reacted as described in Example 1 with 1.7 kg. of epichlorhydrin, 149 grams of sodium hydroxide and 4 grams of water. There are obtained 600 grams of a honey-coloured soft resin with an epoxide number of 7.8, corresponding to an equivalent weight of 205.

70 grams of this resin are hardened with 50.5 grams of phthalic anhydride and 5 drops of N,N-dimethyl cyclohexylamine at 150° C. The heat stability according to Martens of the resulting product is 178° C.

A number of characteristic properties of the hardened products according to the invention are compared in the following table with the properties of a known hardened product consisting of bis-phenol A.

TABLE (A)

| Epoxide resin of epichlorhydrin and— | Properties of the products hardened with phthalic anhydride | | | | |
|---|---|---|---|---|---|
| | Epoxide number | Flexural strength, kg./cm.² | Impact strength, cm.-kg./cm.² | Ball indentation hardness, kg./cm.² | Martens dimensional stability under heat, ° C. |
| Bis-phenol A | 8.4 | 1,440 | 24.5 | 1,950 | 134 |
| 2,4-bis-(4-hydroxycumyl)-phenol (acc. to Example 2) | 8.0 | 1,405 | 13.1 | 2,092 | 180 |
| Reaction product of bis-phenol A and p-isopropenylphenol (acc. to Example 1) | 7.9 | 1,321 | 11.7 | 2,034 | 178 |
| Reaction product prepared acc. to Example 3 | 8.05 | 1,410 | 13.3 | 2,060 | 179 |

(B)

| Epoxide resin of epichlorhydrin and— | Properties of the products hardened with diethylene triamine | | | |
|---|---|---|---|---|
| | Epoxide number | Flexural strength, kg./cm.² | Impact strength, cm.-kg./cm.² | Martens dimensional stability under heat, ° C. |
| Bis-phenol A | 8.4 | 1,442 | 30.1 | 121 |
| Product prepared acc. to Example 3 | 8.05 | 1,328 | 15.6 | 166 |

(C)

| Epoxide resin of epichlorhydrin and— | Properties of the products hardened with butylene-bis-aminopropyl ether | | | |
|---|---|---|---|---|
| | Epoxide number | Flexural strength, kg./cm. | Impact strength, cm.-kg./cm.² | Martens dimensional stability under heat, ° C. |
| Bis-phenol A | 8.4 | 1,290 | 40.8 | 61 |
| Product prepared acc. to Example 3 | 8.05 | 1,450 | 35.7 | 93 |

We claim:

1. A composition of matter comprising at least 10% by weight each of the polyglycidyl ether of 2,4-bis-(4-hydroxycumyl)-phenol wherein substantially all of the hydroxyl groups are etherified with a glycidyl group, a polyglycidyl ether of a bis-(4-hydroxycumyl)-bis-(4-hydroxyphenyl)-2,2-propane having said 4-hydroxycumyl groups bonded in ortho position to at least one hydroxy group of said 4-hydroxyphenyl radicals and substantially all of the hydroxyl groups etherified with the glycidyl group and of a polyglycidyl ether of 2,2-bis-(4-hydroxyphenyl)-propane.

2. A cured insoluble product obtained by heating the composition of claim 1 with an epoxy curing agent selected from the group consisting of amino compounds and polybasic acid anhydrides.

References Cited

UNITED STATES PATENTS 3,281,478  10/1966  Farnham ------------ 260—47

FOREIGN PATENTS 636,467  12/1963  Belgium.
1,150,093  6/1963  Germany.

MURRAY TILLMAN, *Primary Examiner.*
GEORGE F. LESMES, *Examiner.*
PAUL LIEBERMAN, *Assistant Examiner.*